United States Patent
Nakamura

(10) Patent No.: US 12,243,360 B2
(45) Date of Patent: Mar. 4, 2025

(54) INFORMATION PROCESSING DEVICE, INFORMATION PROCESSING METHOD, AND STORAGE MEDIUM

(71) Applicant: TOYOTA JIDOSHA KABUSHIKI KAISHA, Aichi-ken (JP)

(72) Inventor: Akihito Nakamura, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 110 days.

(21) Appl. No.: 18/299,059

(22) Filed: Apr. 12, 2023

(65) Prior Publication Data

US 2023/0401907 A1  Dec. 14, 2023

(30) Foreign Application Priority Data

Jun. 10, 2022  (JP) ................. 2022-094589

(51) Int. Cl.
*G07C 5/02* (2006.01)

(52) U.S. Cl.
CPC ..................... *G07C 5/02* (2013.01)

(58) Field of Classification Search
CPC . G07C 5/02; G06N 3/096; B60W 2050/0029; B60W 2540/30; B60W 40/09
See application file for complete search history.

(56) References Cited

U.S. PATENT DOCUMENTS

| | | | | |
|---|---|---|---|---|
| 8,572,011 B1* | 10/2013 | Sculley, II | ............. | G06N 20/00 707/723 |
| 8,935,036 B1* | 1/2015 | Christensen | ......... | G08G 1/0129 701/29.3 |
| 9,858,832 B1* | 1/2018 | Hsu-Hoffman | ........ | A63F 13/803 |
| 10,407,078 B2* | 9/2019 | Ratnasingam | ......... | B60K 35/00 |
| 10,467,488 B2* | 11/2019 | Sicconi | ................. | G06V 40/20 |
| 11,021,165 B2* | 6/2021 | Noguchi | ................. | H04W 4/40 |
| 12,026,729 B1* | 7/2024 | Sanchez | ............ | G06Q 30/0201 |
| 2012/0016678 A1* | 1/2012 | Gruber | ................... | G06N 5/041 704/E21.001 |
| 2015/0314722 A1* | 11/2015 | Mori | .................. | G01C 21/3629 340/439 |
| 2020/0057487 A1* | 2/2020 | Sicconi | .................... | G06F 3/011 |
| 2020/0387758 A1* | 12/2020 | Kobayashi | ............ | G06F 18/217 |
| 2021/0064664 A1 | 3/2021 | Aruga et al. | | |
| 2021/0074048 A1* | 3/2021 | Namiki | ................. | A63F 13/803 |
| 2021/0097408 A1* | 4/2021 | Sicconi | ................. | G06N 20/00 |
| 2021/0124962 A1* | 4/2021 | Kim | ..................... | G06V 10/764 |

(Continued)

FOREIGN PATENT DOCUMENTS

JP    2017-79538 A    4/2017
JP    2019-185389 A   10/2019

*Primary Examiner* — Adnan Aziz
(74) *Attorney, Agent, or Firm* — HAUPTMAN HAM, LLP

(57) ABSTRACT

An information processing device includes: a specification unit for specifying a reaction of a driver of a vehicle to evaluation information that evaluates driving of the driver and that is output from an output unit while the vehicle is being driven; an estimation unit for estimating an output method of the evaluation information that is appropriate for the driver based on the reaction of the driver, the reaction being the reaction specified by the specification unit; and a changing unit for changing the output method of the evaluation information to be output from the output unit to the output method of the evaluation information that is estimated by the estimation unit.

14 Claims, 8 Drawing Sheets

(56) References Cited

U.S. PATENT DOCUMENTS

| | | | |
|---|---|---|---|
| 2022/0058525 A1* | 2/2022 | Yonetani | G06N 20/00 |
| 2022/0097715 A1* | 3/2022 | Sumikawa | B60W 40/09 |
| 2022/0335846 A1* | 10/2022 | Sanchez | G09B 5/00 |
| 2023/0112797 A1* | 4/2023 | Sicconi | G06V 10/46 |
| | | | 705/26.7 |

* cited by examiner

INFORMATION PROCESSING DEVICE, INFORMATION PROCESSING METHOD, AND STORAGE MEDIUM

CROSS-REFERENCE TO RELATED APPLICATION

This application claims priority to Japanese Patent Application No. 2022-094589 filed on Jun. 10, 2022, incorporated herein by reference in its entirety.

BACKGROUND

1. Technical Field

The present disclosure relates to an information processing device, an information processing method, and a storage medium.

2. Description of Related Art

Japanese Unexamined Patent Application Publication No. 2017-079538 (JP 2017-079538 A) discloses a technique capable of reducing annoyance caused by notifying a user of information regarding the time schedule of external charging more than necessary.

SUMMARY

The technique disclosed in JP 2017-079538 A realizes a notification method suitable for the user by adjusting the transmission frequency of the information regarding the time schedule that is transmitted to a smartphone of the user. However, the technique disclosed in JP 2017-079538 A does not consider making the output method of information that is output to the inside of the vehicle while the vehicle is being driven suitable for the driver, and there is room for improvement.

Therefore, an object of the present disclosure is to provide an information processing device, an information processing method, and an storage medium that can make the output method of information that is output to the inside of the vehicle while the vehicle is being driven suitable for the driver.

An information processing device according to claim 1 includes: a specification unit for specifying a reaction of a driver of a vehicle to evaluation information that evaluates driving of the driver and that is output from an output unit while the vehicle is being driven; an estimation unit for estimating an output method of the evaluation information that is appropriate for the driver based on the reaction of the driver, the reaction being the reaction specified by the specification unit; and a changing unit for changing the output method of the evaluation information to be output from the output unit to the output method of the evaluation information that is estimated by the estimation unit.

In the information processing device according to claim 1, the specification unit specifies the driver's reaction to the evaluation information output from the output unit while the vehicle is being driven. The estimation unit estimates the output method of the evaluation information that is suitable for the driver based on the driver's reaction specified by the specification unit. The changing unit changes the output method of the evaluation information to be output from the output unit to the output method of the evaluation information that is estimated by the estimation unit. As a result, the information processing device changes the output method of the evaluation information based on the driver's reaction to the evaluation information output from the output unit while the vehicle is being driven, enabling the output method of the evaluation information to be output to the inside of the vehicle to be suitable for the driver.

The information processing device according to claim 2, in claim 1, further includes an updating unit for updating a trained model that has undergone machine learning for adjusting the output method of the evaluation information that is appropriate for another driver having an individual characteristic similar to the driver with a model for estimating the output method of the evaluation information that is appropriate for the driver, using individual characteristic information indicating an individual characteristic of the driver and reaction information in which the reaction of the driver is accumulated, the reaction being the reaction specified by the specification unit.

In the information processing device according to claim 2, the updating unit updates the trained model suitable for another driver having individual characteristics similar to the driver with a model for estimating the output method of the evaluation information that is suitable for the driver, using the driver's individual characteristic information and the driver's reaction information. As a result, in the information processing device, a model for estimating the output method of the evaluation information that is suitable for the driver can be generated in a shorter period of time using the trained model suitable for another driver having similar individual characteristics, compared to the case where the above trained model is not used.

In the information processing device according to claim 3, in claim 2, the estimation unit inputs the individual characteristic information of the driver and the reaction information of the driver to the model updated by the updating unit to estimate the output method of the evaluation information that is appropriate for the driver.

In the information processing device according to claim 3, the estimation unit inputs the individual characteristic information of the driver and the reaction information of the driver to the model updated by the updating unit to estimate the output method of the evaluation information that is appropriate for the driver. As a result, the information processing device can output the evaluation information from the output unit by an output method optimized based on the driver's individual characteristics and the driver's reaction to the evaluation information output from the output unit while the vehicle is being driven.

In the information processing device according to claim 4, in claim 1, the specification unit specifies the reaction of the driver to the evaluation information output from the output unit, based on behavior of the driver when the evaluation information is output from the output unit.

In the information processing device according to claim 4, the specification unit specifies the reaction of the driver to the evaluation information output from the output unit, based on behavior of the driver when the evaluation information is output from the output unit. As a result, the information processing device can make the output method of the evaluation information to be output to the inside of the vehicle while the vehicle is being driven suitable for the driver without asking the driver for his/her opinion on the output method of the evaluation information output from the output unit.

In the information processing device according to claim 5, in claim 4, the specification unit specifies the reaction of the driver to the evaluation information output from the output unit, based on an answer of the driver to a question regarding the evaluation information.

In the information processing device according to claim 5, the specification unit specifies the reaction of the driver to the evaluation information output from the output unit, based on an answer of the driver to a question regarding the evaluation information. As a result, the information processing device can more accurately specify the driver's reaction compared to the case where the driver's reaction to the evaluation information output from the output unit is specified only by an indirect method.

In an information processing method according to claim 6, a computer executes processes including: specifying a reaction of a driver of a vehicle to evaluation information that evaluates driving of the driver and that is output from an output unit while the vehicle is being driven; estimating an output method of the evaluation information that is appropriate for the driver based on the specified reaction of the driver; and changing the output method of the evaluation information to be output from the output unit to the estimated output method of the evaluation information.

In a storage medium according to claim 7, an information processing program causes a computer to execute processes including: specifying a reaction of a driver of a vehicle to evaluation information that evaluates driving of the driver and that is output from an output unit while the vehicle is being driven; estimating an output method of the evaluation information that is appropriate for the driver based on the specified reaction of the driver; and changing the output method of the evaluation information to be output from the output unit to the estimated output method of the evaluation information.

The information processing device according to claim 4 may adopt another aspect described below. As another aspect, in the information processing device according to claim 4, in any one of claims 1 to 3, the specification unit specifies the reaction of the driver to the evaluation information output from the output unit, based on behavior of the driver when the evaluation information is output from the output unit.

As described above, the information processing device, the information processing method, and the storage medium according to the present disclosure can make the output method of information that is output to the inside of the vehicle while the vehicle is being driven suitable for the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an information processing system 10 according to the present embodiment will be described. The information processing system 10 according to the present embodiment is a system that makes the output method of information that is output to the inside of a vehicle while the vehicle is being driven suitable for a driver.

First Embodiment

Figure 1:
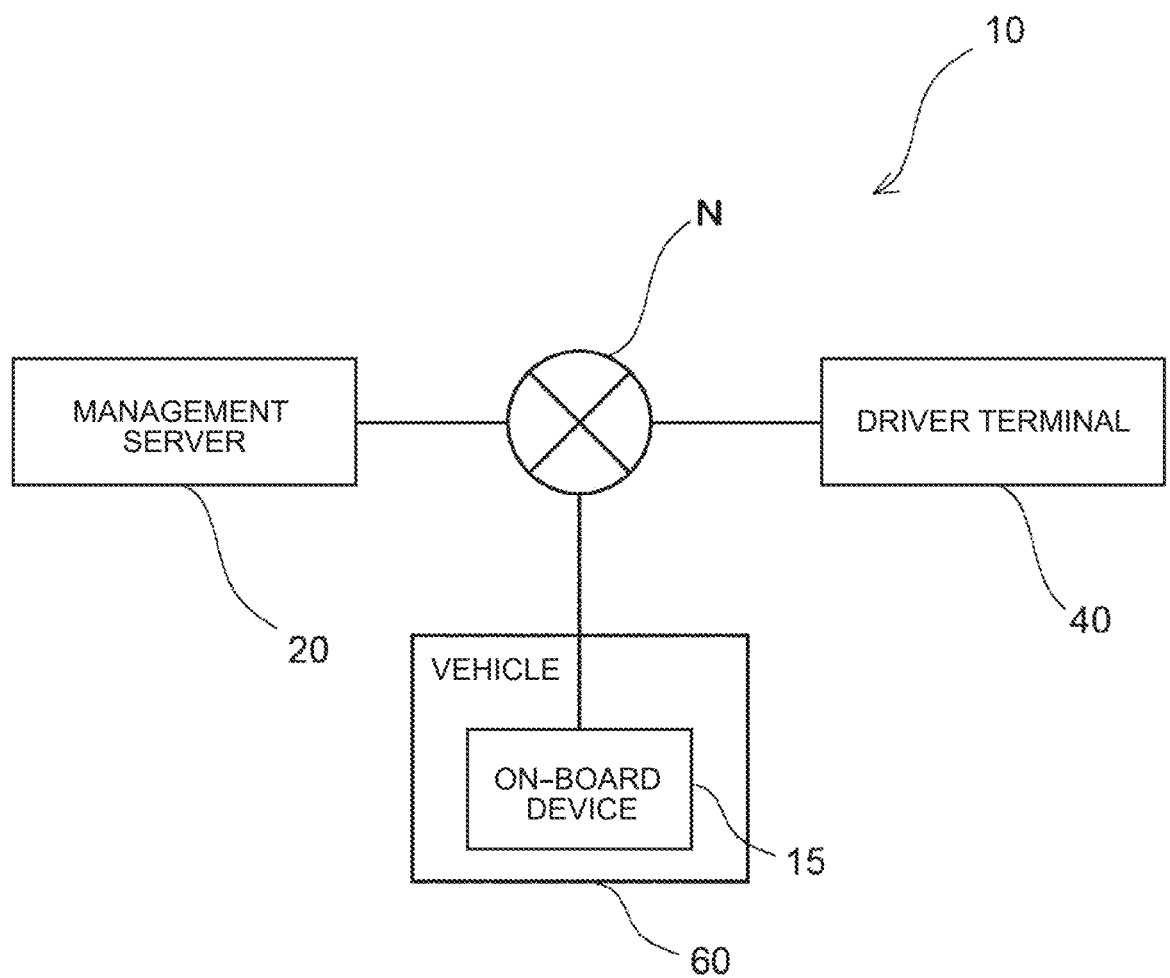
FIG. 1 is a diagram showing a schematic configuration of an information processing system according to the present embodiment.

First, a first embodiment of the information processing system 10 according to the present embodiment will be described. FIG. 1 is a diagram showing a schematic configuration of the information processing system 10.

As shown in FIG. 1, the information processing system 10 includes a vehicle a management server 20, and a driver terminal 40. An on-board device 15 mounted on the vehicle 60, the management server 20, and the driver terminal 40 are connected via a network N, and are able to communicate with each other.

The vehicle 60 may be an engine vehicle, a hybrid electric vehicle, or a battery electric vehicle. However, in the first embodiment, the vehicle 60 is an engine vehicle as an example.

The management server 20 is a server computer owned by a predetermined business operator. The management server 20 is an example of an "information processing device".

The driver terminal 40 is a mobile terminal owned by a driver of the vehicle 60. As an example, a portable personal computer (laptop PC), a smartphone, a tablet terminal, or the like is applied to the driver terminal 40. In the first embodiment, as an example, the driver terminal 40 is a smartphone.

In FIG. 1, only one vehicle 60 is illustrated as a vehicle and only one driver terminal 40 is illustrated as a driver terminal, but there is a plurality of vehicles and driver terminals. That is, in the information processing system 10, there is a plurality of vehicles and driver terminals, and there is a plurality of drivers corresponding to each vehicle.

Figure 2:
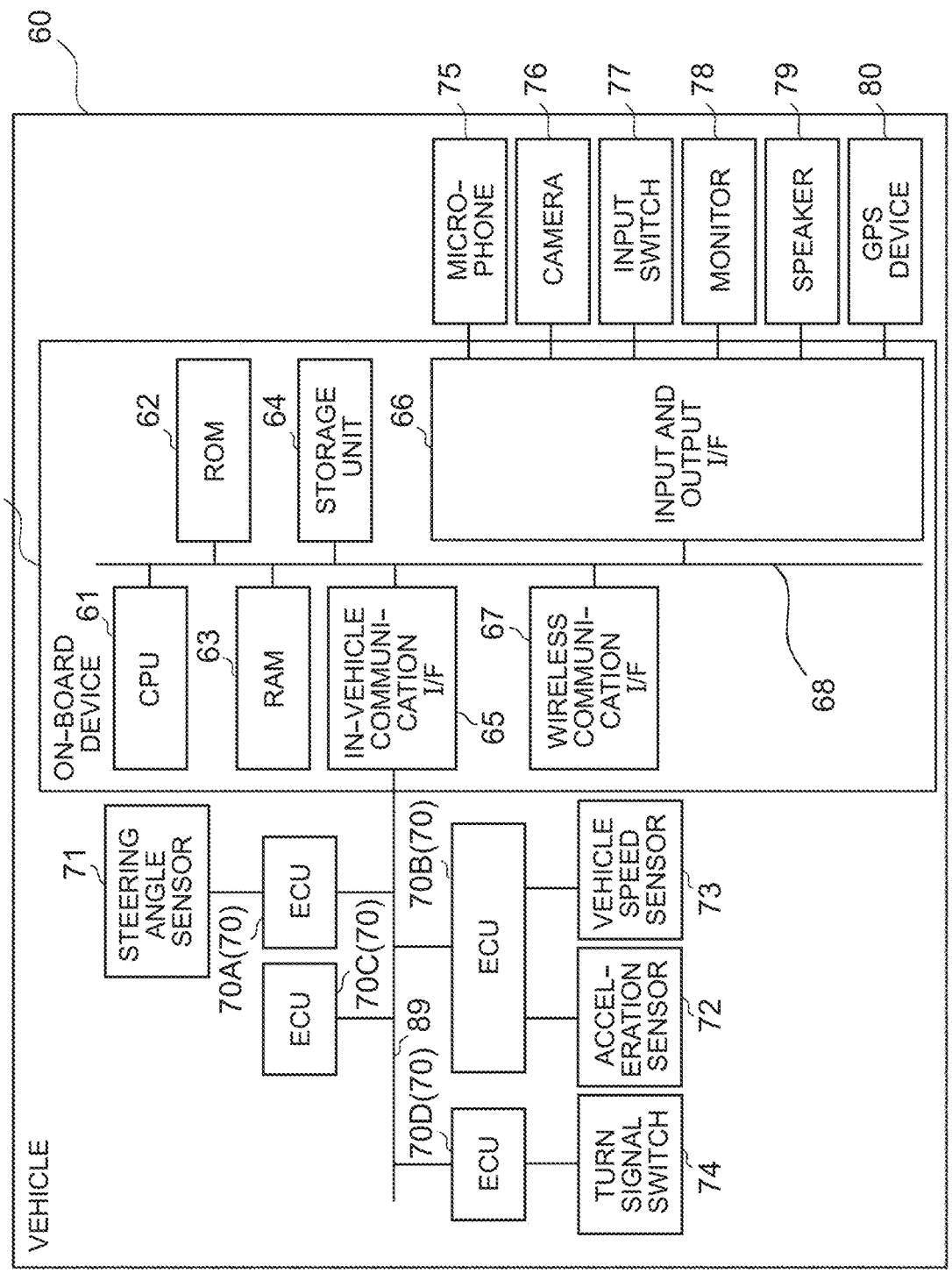
FIG. 2 is a block diagram showing a hardware configuration of a vehicle according to the present embodiment.

Next, the hardware configuration of the vehicle 60 will be described. FIG. 2 is a block diagram showing the hardware configuration of the vehicle 60.

As shown in FIG. 2, the vehicle 60 includes the on-board device 15, a plurality of ECUs 70, a steering angle sensor 71, an acceleration sensor 72, a vehicle speed sensor 73, a turn signal switch 74, a microphone 75, a camera 76, an input switch 77, a monitor 78, a speaker 79, and a global positioning system (GPS) device 80.

The on-board device 15 is configured to include a central processing unit (CPU) 61, a read-only memory (ROM) 62, a random access memory (RAM) 63, a storage unit 64, an in-vehicle communication interface (I/F) 65, an input and output OF 66, and a wireless communication I/F 67. The CPU 61, the ROM 62, the RAM 63, the storage unit 64, the in-vehicle communication I/F 65, the input and output I/F 66, and the wireless communication I/F 67 are connected to each other so as to be communicable with each other via an internal bus 68.

The CPU 61 is a central processing unit that executes various programs and that controls various units. That is, the CPU 61 reads the program from the ROM 62 or the storage unit 64 and executes the program using the RAM 63 as a work area. The CPU 61 controls each of the above configurations and performs various arithmetic processes in accordance with the program recorded in the ROM 62 or the storage unit 64.

The ROM 62 stores various programs and various data. The RAM 63 temporarily stores a program or data as a work area.

The storage unit 64 is composed of a storage device such as an embedded Multi-Media Card (eMMC) or a universal flash storage (UFS), and stores various programs and various data.

The in-vehicle communication I/F 65 is an interface for connecting to the ECUs 70. For the interface, a communication standard based on a controller area network (CAN) protocol is used. The in-vehicle communication I/F 65 is connected to an external bus 89.

The ECUs 70 are provided for respective functions of the vehicle 60, and in the first embodiment, an ECU 70A, an ECU 70B, an ECU 70C, and an ECU 70D are provided. The ECU 70A is exemplified by an electric power steering ECU, and the steering angle sensor 71 is connected to the ECU 70A. The ECU 70B is exemplified by a vehicle stability control (VSC) ECU, and the acceleration sensor 72 and the vehicle speed sensor 73 are connected to the ECU 70B. In addition to the acceleration sensor 72 and the vehicle speed sensor 73, a yaw rate sensor may be connected to the ECU 70B.

The ECU 70C is exemplified by an engine ECU, and detects the engine speed and the engine torque of the vehicle 60 to control the engine. The ECU 70C detects fuel consumption based on a fuel flow rate acquired from sensors (not shown). Further, the ECU 70C detects the accelerator operation of the vehicle 60. The engine speed, the engine torque, the fuel consumption, and the accelerator operation detected by the ECU 70C are stored in the storage unit 64 and transmitted to the management server 20 as driving operation information regarding the driving operation of the driver. The ECU 70D is exemplified by a steering ECU, and the turn signal switch 74 is connected to the ECU 70D. The turn signal switch 74 is provided on the steering column for operating the turn signal. The ECU 70D detects the operation of the turn signal switch 74 by the driver as the turn signal operation. The turn signal operation detected by the ECU 70D is stored in the storage unit 64 and transmitted to the management server 20 as the driving operation information.

The steering angle sensor 71 is a sensor for detecting the steering angle of the steering wheel. The steering angle detected by the steering angle sensor 71 is stored in the storage unit 64 and transmitted to the management server 20 as the driving operation information.

The acceleration sensor 72 is a sensor for detecting the acceleration acting on the vehicle 60. The acceleration sensor 72 is, for example, a three-axis acceleration sensor that detects the acceleration applied in the vehicle front-rear direction as the X-axis direction, the vehicle width direction as the Y-axis direction, and the vehicle height direction as the Z-axis direction. The acceleration detected by the acceleration sensor 72 is stored in the storage unit 64 and transmitted to the management server 20 as the driving operation information.

The vehicle speed sensor 73 is a sensor for detecting a vehicle speed of the vehicle 60. The vehicle speed sensor 73 is, for example, a sensor provided on a vehicle wheel. The vehicle speed detected by the vehicle speed sensor 73 is stored in the storage unit 64 and transmitted to the management server 20 as the driving operation information.

The input and output OF 66 is an interface for communicating with the microphone 75, the camera 76, the input switch 77, the monitor 78, the speaker 79, and the GPS device 80 mounted on the vehicle 60.

The microphone 75 is a device provided on the front pillar, a dashboard, or the like of the vehicle 60, and collects voices emitted by the driver of the vehicle 60. The microphone 75 may be provided in the camera 76 that will be described later.

The camera 76 is, for example, an imaging device that performs imaging using an imaging element such as a charge coupled device (CCD) image sensor or a complementary metal oxide semiconductor (CMOS) image sensor. The camera 76 includes, for example, a first camera provided in the front part of the vehicle 60 for imaging ahead of the vehicle, and a second camera provided in the upper part of the windshield or the dashboard of the vehicle 60 and directed to the driver. The image captured by the first camera of the camera 76 is used, for example, for recognizing the inter-vehicle distance from the preceding vehicle traveling ahead of the vehicle 60, the lanes, the traffic lights, and the like. The image captured by the second camera of the camera 76 is used, for example, for detecting the facial expression of the driver. The image captured by the camera 76 is stored in the storage unit 64. The image captured by the first camera of the camera 76 is transmitted to the management server 20 as the driving operation information. Also, the image captured by the second camera of the camera 76 is transmitted to the management server 20 as driver information indicating the behavior of the driver. Note that the camera 76 may be configured as an imaging device for other uses such as a drive recorder and an advanced driver assistance system (ADAS). Further, the camera 76 may be connected to the on-board device 15 via the ECU 70 (for example, a camera ECU).

The input switch 77 is provided on the instrument panel, the center console, the steering wheel, or the like, and is a switch for inputting an operation by fingers of the driver. As the input switch 77, for example, a push button type numeric keypad, a touch pad, or the like can be adopted. In the first embodiment, as the input switch 77, a cancel switch is provided on the steering wheel. The cancel switch is a switch that, when operated by the driver, stops (cancels) the output of evaluation information for evaluating the driver's driving, which is output from the monitor 78 and the speaker 79. The operation of the cancel switch is stored in the storage unit 64 and transmitted to the management server 20 as the driver information.

The monitor 78 is a liquid crystal monitor provided on an instrument panel, an instrument cluster, or the like, for displaying an image or the like of a proposal of an operation regarding a function of the vehicle 60 and an explanation of the function. The monitor 78 may be provided as a touch panel that also serves as the input switch 77.

The speaker 79 is a device provided on the instrument panel, the center console, the front pillar, the dashboard, or the like, for outputting a voice or the like of the proposal of the operation regarding the function of the vehicle 60 and the explanation of the function. The speaker 79 may be provided on the monitor 78.

In the first embodiment, the evaluation information is output from the monitor 78 and the speaker 79 while the vehicle 60 is being driven. The evaluation information is information for evaluating the driver's driving, and indicates, for example, whether the driver's driving was good or bad. The monitor 78 and speaker 79 are examples of the "output unit".

The GPS device 80 is a device that measures the current position of the vehicle 60. The GPS device 80 includes an antenna (not shown) that receives signals from GPS satellites. Note that, the GPS device 80 may be connected to the on-board device 15 via a car navigation system connected to the ECU 70 (for example, a multimedia ECU).

The wireless communication OF 67 is a wireless communication module for communicating with the management server 20. For the wireless communication module, for example, communication standards such as 5G, long term evolution (LTE), and Wi-Fi (registered trademark) are used. The wireless communication OF 67 is connected to the network N.

Figure 3:
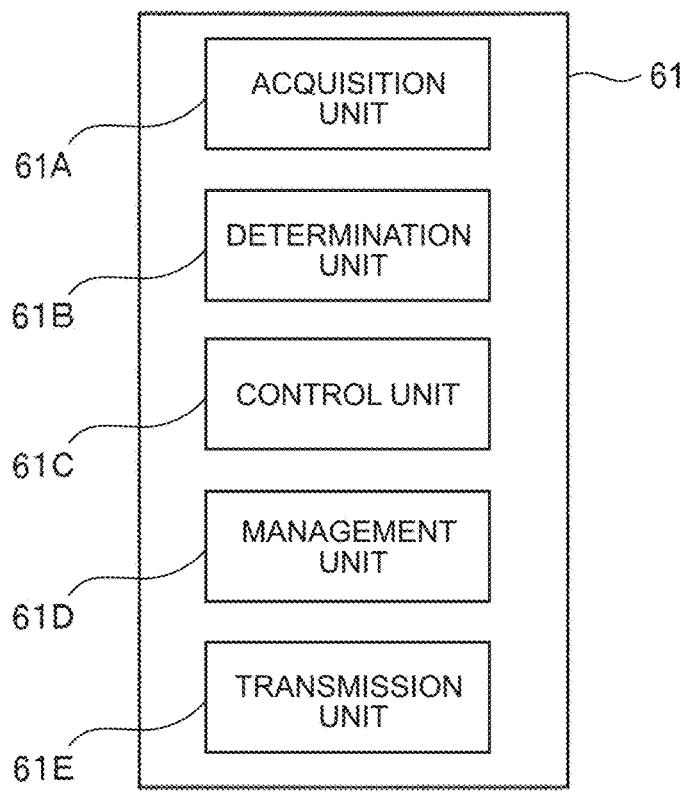
FIG. 3 is a block diagram showing an example of a functional configuration of an on-board device according to the present embodiment.

Next, a functional configuration of the on-board device 15 will be described. FIG. 3 is a block diagram showing an example of the functional configuration of the on-board device 15.

As shown in FIG. 3, the CPU 61 of the on-board device 15 has, as functional configurations, an acquisition unit 61A, a determination unit 61B, a control unit 61C, a management unit 61D, and a transmission unit 61E. Each functional configuration is realized when the CPU 61 reads and executes a program stored in the ROM 62 or the storage unit 64.

The acquisition unit 61A acquires the driving operation information. For example, the acquisition unit 61A acquires, as the driving operation information, a steering angle, an acceleration, a vehicle speed, and a turn signal operation of the vehicle 60 respectively detected by a steering angle sensor 71, an acceleration sensor 72, a vehicle speed sensor 73, and a turn signal switch 74. The acquisition unit 61A also acquires, as the driving operation information, the engine speed, the engine torque, the fuel consumption, and the accelerator operation of the vehicle 60 detected by the ECU 70C. Furthermore, the acquisition unit 61A acquires an image captured by the first camera of the camera 76 as the driving operation information. The above information is part of the driving operation information that can be acquired by the acquisition unit 61A, and the acquisition unit 61A can also acquire information regarding the driving operation of the driver other than the above information as the driving operation information.

The acquisition unit 61A acquires from the management server 20 the output method of the evaluation information that is suitable for the driver of the vehicle 60. As an example, the output method of the evaluation information is determined by combining the output frequency of the evaluation information, the display content on the monitor 78, and the output content from the speaker 79. The output frequency of the evaluation information is an index indicating how many times the evaluation information is displayed on the monitor 78 and how many times the evaluation information is output from the speaker 79 per unit time. The display content on the monitor 78 is, for example, character content, character color, character size, and the like. The output content from the speaker 79 is, for example, a voice type such as a male voice, a female voice, or a low voice, a high voice, and a tone type such as a gentle tone or a harsh tone.

The determination unit 61B determines items of the evaluation information to be output from the monitor 78 and the speaker 79 based on the driving operation information acquired by the acquisition unit 61A. In the first embodiment, as items of the evaluation information, a plurality of items such as Temporary stop: Good, Temporary stop: Bad, Braking: Good, and Braking: Bad are provided. Each item of the evaluation information is associated with specific driving operation information. The determination unit 61B determines items associated with the driving operation information acquired by the acquisition unit 61A as items of the evaluation information to be output from the monitor 78 and the speaker 79. For example, the determination unit 61B determines the items of the evaluation information to be output from the monitor 78 and the speaker 79 to be "Braking: Good" or "Braking: Bad" based on the acceleration and vehicle speed of the vehicle 60 acquired as the driving operation information by the acquisition unit 61A.

Further, the determination unit 61B determines the output method of the evaluation information that is suitable for the driver of the vehicle 60 acquired by the acquisition unit 61A as the output method of the evaluation information to be output from the monitor 78 and the speaker 79 of the vehicle 60.

The control unit 61C performs control to output the items of the evaluation information determined by the determination unit 61B from the monitor 78 and the speaker 79 while the vehicle 60 is being driven by the output method determined by the determination unit 61B.

The management unit 61D manages the behavior of the driver when the evaluation information is output from the monitor 78 and the speaker 79. The management unit 61D manages, as the behavior of the driver, whether the cancel switch is operated within a predetermined time after the evaluation information is output, and the facial expression of the driver. Specifically, when the cancel switch is operated within a predetermined time after the evaluation information is output, the management unit 61D causes the storage unit 64 to store the operation of the cancel switch as the driver information. In addition, the management unit 61D controls the second camera of the camera 76, captures an image of the driver's face within a predetermined time after the evaluation information is output, and causes the storage unit 64 to store the captured image as the driver information.

The transmission unit 61E transmits the driving operation information and the driver information to the management server 20. The transmission unit 61E transmits the driving operation information and the driver information stored in the storage unit 64 to the management server 20 periodically, for example, every day.

Figure 4:
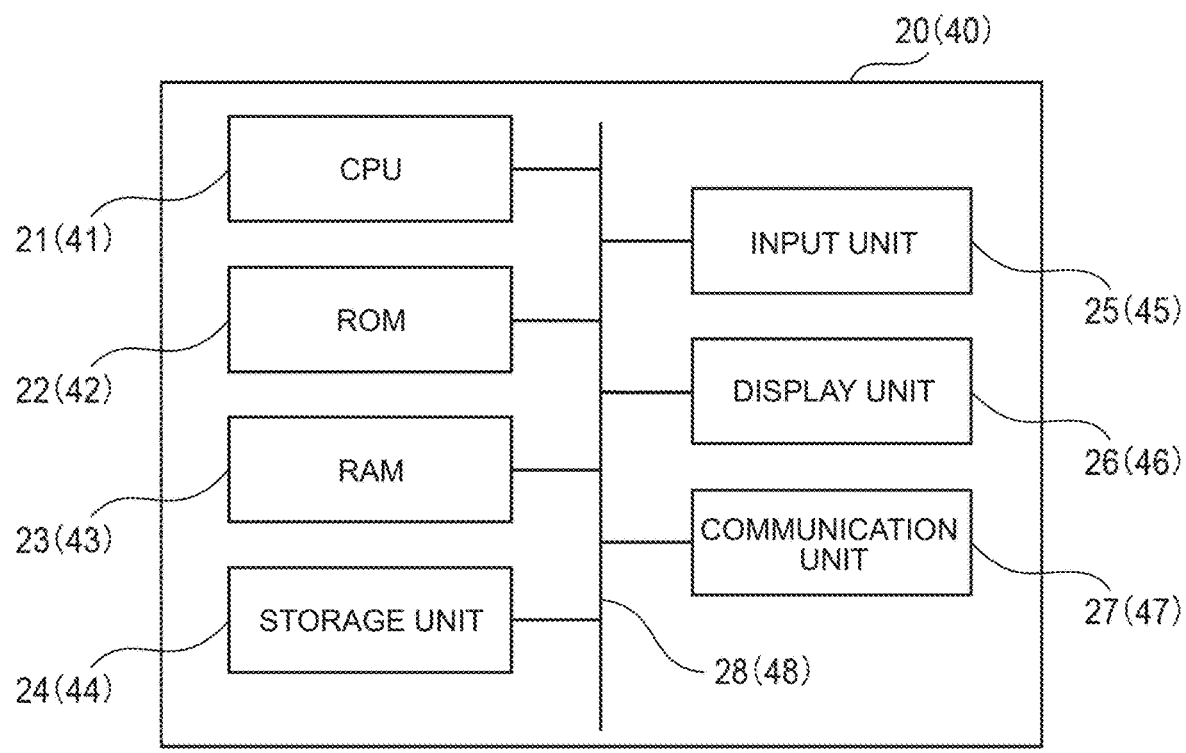
FIG. 4 is a block diagram showing hardware configurations of a management server and a driver terminal according to the present embodiment.

Next, hardware configurations of the management server 20 and the driver terminal 40 will be described. FIG. 4 is a block diagram showing the hardware configurations of the management server 20 and the driver terminal 40. Since the management server 20 and the driver terminal 40 basically have general computer configurations, the management server 20 will be described as a representative.

As shown in FIG. 4, the management server 20 includes a CPU 21, a ROM 22, a RAM 23, a storage unit 24, an input unit 25, a display unit 26, and a communication unit 27. The configurations are communicably connected to each other via a bus 28.

The CPU 21 is a central processing unit that executes various programs and that controls various units. That is, the CPU 21 reads the program from the ROM 22 or the storage unit 24 and executes the program using the RAM 23 as a work area. The CPU 21 controls each of the above configurations and performs various arithmetic processes in accordance with the program recorded in the ROM 22 or the storage unit 24.

The ROM 22 stores various programs and various data. The RAM 23 temporarily stores a program or data as a work area.

The storage unit 24 is composed of a storage device such as a hard disk drive (HDD), a solid state drive (SSD), or a flash memory, and stores various programs and various data. The storage unit 24 is an example of a storage medium.

The input unit 25 includes a pointing device such as a mouse, a keyboard, a microphone, a camera, and the like, and is used for performing various inputs.

The display unit 26 is, for example, a liquid crystal display and displays various types of information. A touch panel may be adopted as the display unit 26 and may function as the input unit 25.

The communication unit 27 is an interface for communicating with other devices. For the communication, for example, a wired communication standard such as Ethernet (registered trademark) or FDDI, or a wireless communication standard such as 4G, Bluetooth (registered trademark), or Wi-Fi (registered trademark) is used.

Figure 5:
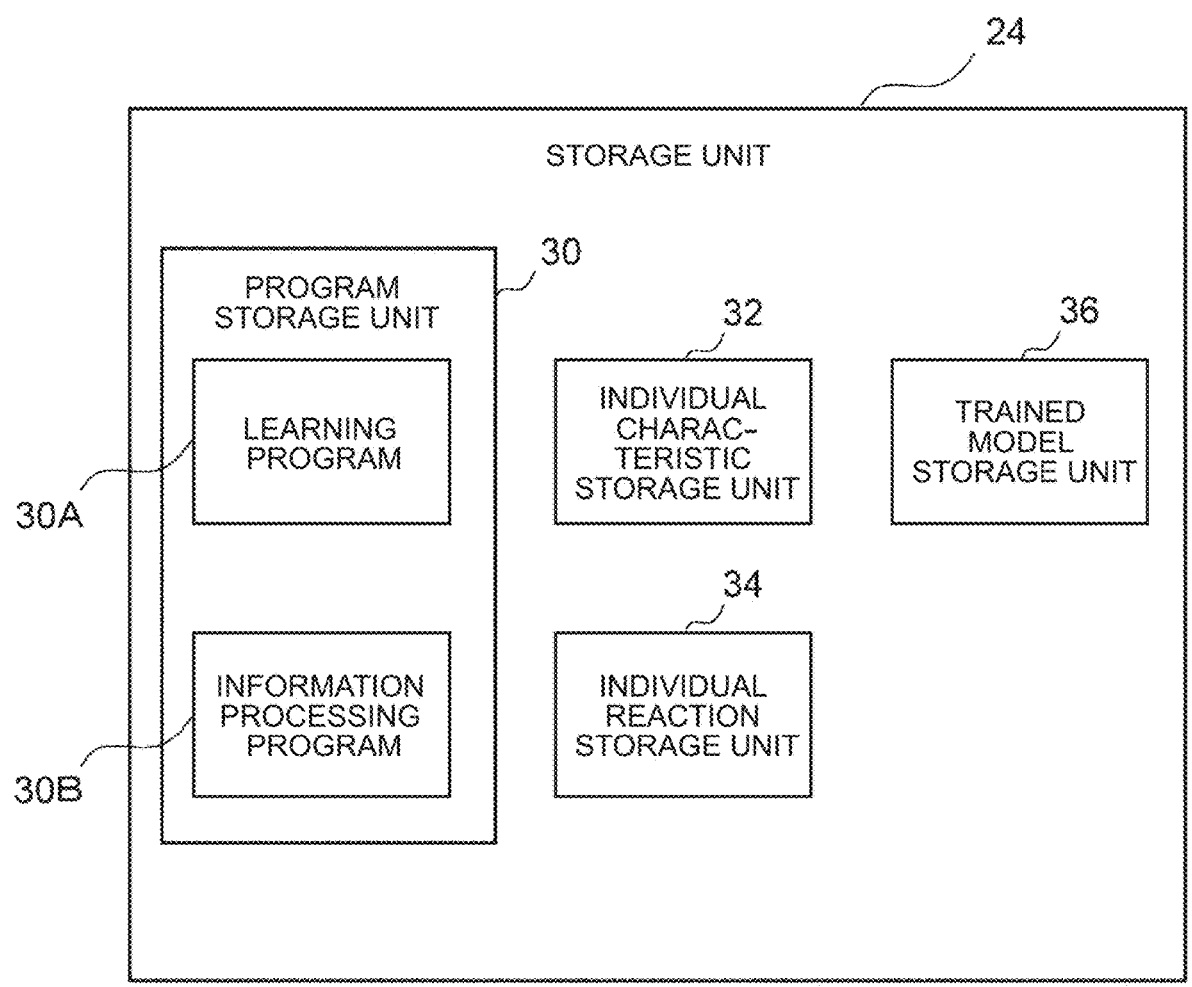
FIG. 5 is a block diagram showing a configuration of a storage unit of the management server according to the present embodiment.

FIG. 5 is a block diagram showing a configuration of the storage unit 24 of the management server 20.
As shown in FIG. 5, the storage unit 24 includes a program storage unit 30, an individual characteristic storage unit 32, an individual reaction storage unit 34, and a trained model storage unit 36.

The program storage unit 30 stores a learning program 30A and an information processing program 30B. The learning program 30A is a program for causing the CPU 21 to execute a learning process (see FIG. 7) via machine learning, which will be described later, and to generate a trained model as a result of the learning process. The information processing program 30B is a program for causing the CPU 21 to execute an updating process (see FIG. 8) and a changing process (see FIG. 9), which will be described later.

The individual characteristic storage unit 32 stores individual characteristic information indicating individual characteristics of each driver of each vehicle 60. The individual characteristic information includes, for example, the driver's age, gender, personality, and the like. The generation method of the individual characteristic information of the driver of the vehicle 60 will be described later.

The individual reaction storage unit 34 stores reaction information in which the driver's reaction to the evaluation information output from the monitor 78 and the speaker 79 while the vehicle 60 is being driven is accumulated. The reaction information includes, for example, whether each driver's reaction to the evaluation information output by each output method is good or bad. As an example, the individual reaction storage unit 34 stores the reaction information such as the reaction to the evaluation information output by the output method A for driver A is good and the reaction to the evaluation information output by the output method B is bad, the reaction to the evaluation information output by the output method A for driver B is bad and the reaction to the evaluation information output by the output method B is good, or the like.

The trained model storage unit 36 stores a trained model generated as a result of the learning process and an updated model obtained by updating the trained model, in association with the driver. The updated model is an example of a "model".

Figure 6:
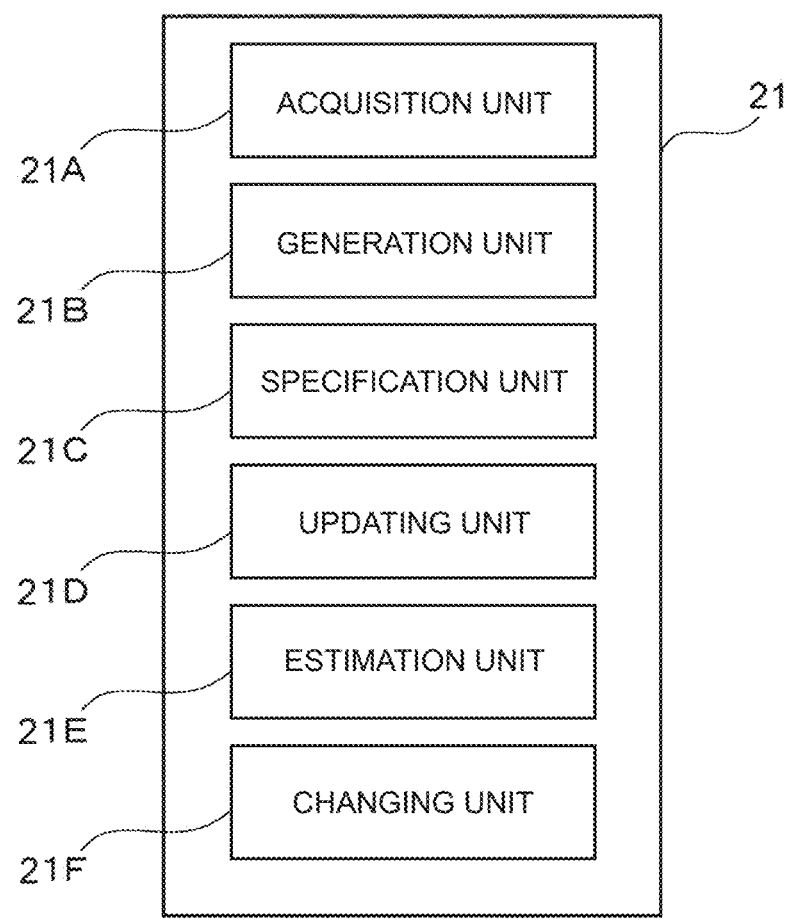
FIG. 6 is a block diagram showing an example of a functional configuration of the management server according to the present embodiment.

Next, a functional configuration of the management server 20 will be described.
FIG. 6 is a block diagram showing an example of the functional configuration of the management server 20.

As shown in FIG. 6, the CPU 21 of the management server 20 has, as functional configurations, an acquisition unit 21A, a generation unit 21B, a specification unit 21C, an updating unit 21D, an estimation unit 21E, and a changing unit 21F. Each functional configuration is realized when the CPU 21 reads and executes the information processing program 30B stored in the storage unit 24.
The acquisition unit 21A acquires the driving operation information and the driver information from the vehicle 60.

Based on the driving operation information acquired by the acquisition unit 21A and the result of an examination for estimating the individual characteristics of each driver of each vehicle 60, the generation unit 21B generates the individual characteristic information for each driver of each vehicle 60. For example, the generation unit 21B generates the individual characteristic information of driver A such as "age: 35 years old, gender: male, personality: mild-mannered", or the like, based on the driving operation information of the driver A and the result of the above examination. The individual characteristic information generated by the generation unit 21B is stored in the individual characteristic storage unit 32 in association with the driver.

Each time the acquisition unit 21A acquires the driving operation information, the generation unit 21B updates the individual characteristic information of the driver that is associated with the acquired driving operation information. For example, the generation unit 21B updates the individual characteristic information of driver A stored in the individual characteristic storage unit 32 with "age: 35 years old, gender: male, personality: short-tempered", or the like, based on the driving operation information acquired by the acquisition unit 21A after a certain period of time has passed since the generation of the individual characteristic information of driver A and the result of the above examination.

The specification unit 21C specifies whether the driver's reaction to the evaluation information output from the monitor 78 and the speaker 79 while the vehicle 60 is being driven is good or bad. In the first embodiment, as an example, the specification unit 21C specifies whether the reaction is good or bad based on the behavior of the driver when the evaluation information is output from the monitor 78 and the speaker 79.

For example, when the specification unit 21C detects that the driver operates the cancel switch as the above behavior based on the driver information acquired by the acquisition unit 21A, the specification unit 21C determines that the driver's reaction to the above evaluation information is "bad". Further, when the specification unit 21C detects an unpleasant facial expression of the driver as the above behavior based on the driver information acquired by the acquisition unit 21A, the specification unit 21C determines that the driver's reaction to the above evaluation information is "bad". In contrast, when the specification unit 21C detects a happy facial expression of the driver as the above behavior based on the driver information acquired by the acquisition unit 21A, the specification unit 21C determines that the driver's reaction to the above evaluation information is "good". The specification unit 21C performs known image processing on the image of the driver's face captured by the second camera of the camera 76, which is acquired by the acquisition unit 21A as the driver information, so as to detect the facial expression of the driver.

Whether the driver's reaction to the evaluation information output by the one output method (example: output method A) specified by the specification unit 21C is good or bad is stored in the individual reaction storage unit 34 as the reaction information of the driver.

The updating unit 21D updates a trained model that has undergone machine learning for adjusting the output method of the evaluation information that is suitable for another driver who has individual characteristics similar to the driver, with the updated model for estimating the output method of the evaluation information that is suitable for the driver, using the individual characteristic information and the reaction information of the driver.

First, the updating unit 21D refers to the driver's individual characteristic information stored in the individual characteristic storage unit 32 to specify another driver having similar individual characteristics to the driver. In the first embodiment, "having similar individual characteristics to the driver" means that the matching degree with the individual characteristic information of the driver is equal to or higher than a predetermined standard.

Next, the updating unit 21D acquires the trained model of the other driver specified above from the trained model storage unit 36. Note that, when there are a plurality of other drivers with the matching degree with the driver's individual characteristic information being equal to or higher than the predetermined standard, the updating unit 21D selects the trained model of another driver with the highest matching degree. Then, the updating unit 21D inputs, to the acquired trained model of the other driver, the driver's individual characteristic information stored in the individual characteristic storage unit 32 and the driver's reaction information stored in the individual reaction storage unit 34, as learning data for performing machine learning of the model so as to adjust the output method of the evaluation information that is suitable for the driver. As a result of machine learning, the trained model of the other driver is updated with the updated model for estimating the output method of the evaluation information that is suitable for the driver.

The updated model of the driver that has been updated by the updating unit 21D is stored in the trained model storage unit 36 in association with the driver.

The estimation unit 21E estimates the output method of the evaluation information that is suitable for the driver based on whether the driver's reaction specified by the specification unit 21C is good or bad. Specifically, the estimation unit 21E inputs, to the updated model of the driver that is stored in the trained model storage unit 36, the driver's individual characteristic information stored in the individual characteristic storage unit 32 and the driver's reaction information stored in the individual reaction storage unit 34, to estimate the output method of the evaluation information that is suitable for the driver.

In the first embodiment, the estimation unit 21E updates the updated model by machine learning periodically, for example, every day, using the driver's individual characteristic information stored in the individual characteristic storage unit 32 and the driver's reaction information stored in the individual reaction storage unit 34 as the learning data, to estimate the latest output method of the evaluation information that is suitable for the driver.

The changing unit 21F changes the output method of the evaluation information to be output from the monitor 78 and the speaker 79 to the output method of the evaluation information that has been estimated by the estimation unit 21E. In the first embodiment, the changing unit 21F transmits the output method of the evaluation information that has been estimated by the estimation unit 21E to the vehicle 60 to cause the vehicle 60 to change the output method of the evaluation information to be output from the monitor 78 and the speaker 79.

Next, the flow of the learning process in which the management server 20 generates a trained model will be described.

Figure 7:
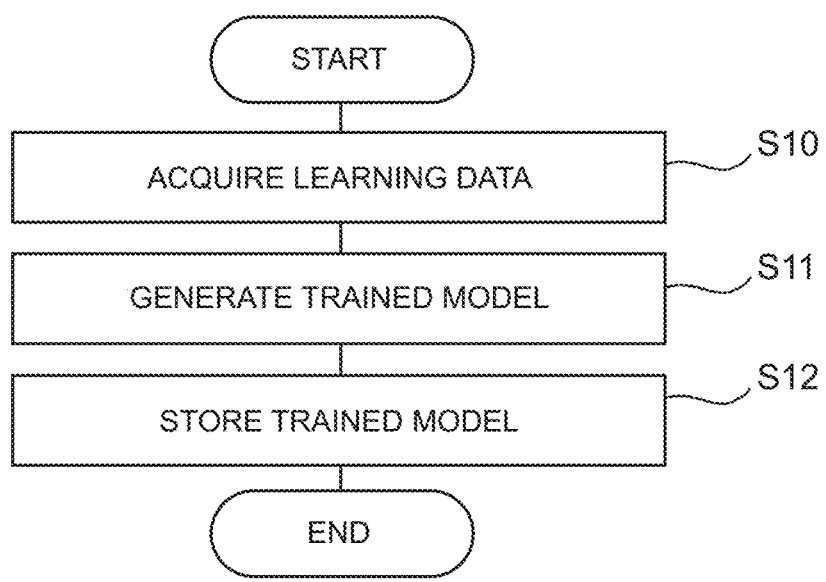
FIG. 7 is a flowchart showing a flow of a learning process executed by the management server according to the present embodiment.

FIG. 7 is a flowchart showing a flow of the learning process executed by the management server 20. The learning process is executed when the CPU 21 reads the learning program 30A from the storage unit 24, expands the learning program 30A into the RAM 23, and executes the program.

In step S10 shown in FIG. 7, the CPU 21 acquires learning data to be learned by the model from the individual characteristic storage unit 32 and the individual reaction storage unit 34. Specifically, the CPU 21 acquires the individual characteristic information corresponding to the driver of the vehicle 60 for which the trained model is to be generated from the individual characteristic storage unit 32, and acquires the reaction information corresponding to the driver from the individual reaction storage unit 34. In the first embodiment, a neural network is used as a model for learning the learning data. Then, the process proceeds to step S11.

In step S11, the CPU 21 inputs the learning data acquired in step S10 to the above model to generate a trained model for estimating the output method of the evaluation information that is suitable for the driver. Then, the process proceeds to step S12.

In step S12, the CPU 21 associates the trained model generated in step S11 with the driver and stores it in the trained model storage unit 36. Then, the learning process ends.

Next, the flow of the updating process in which the management server 20 updates the trained model of another driver having similar individual characteristics to the driver of the vehicle 60 with the updated model for estimating the output method of the evaluation information that is suitable for the driver will be described.

Figure 8:
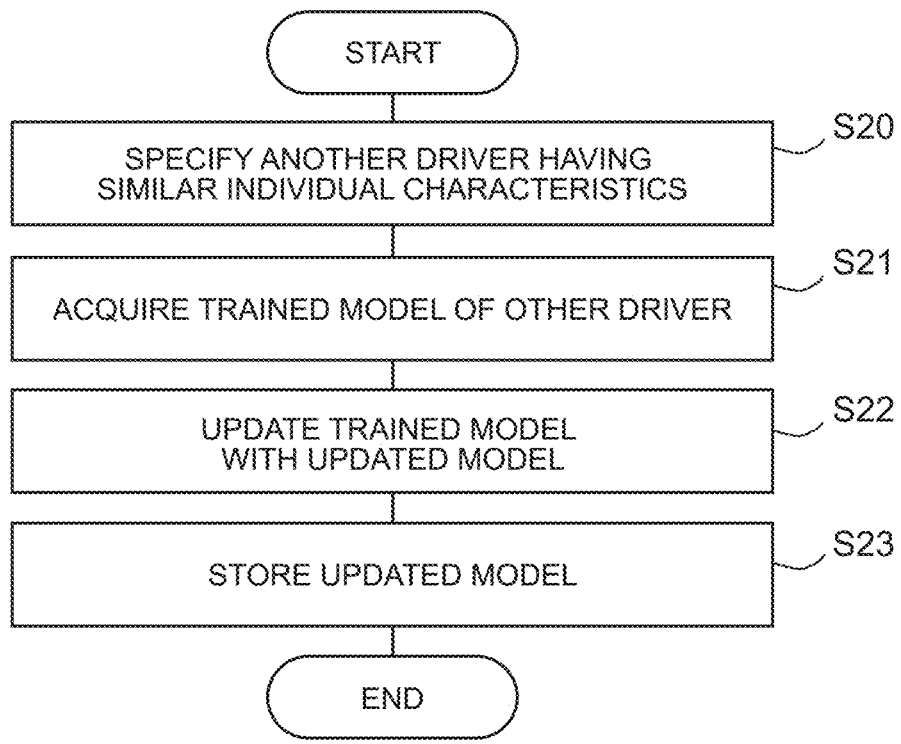
FIG. 8 is a flowchart showing a flow of an updating process executed by the management server according to the present embodiment.

FIG. 8 is a flowchart showing a flow of the updating process executed by the management server 20. The updating process is executed when the CPU 21 reads the information processing program 30B from the storage unit 24, expands the information processing program 30B into the RAM 23, and executes the program. In the following description of FIG. 8, the driver of the vehicle 60 is referred to as "driver A", and another driver having similar individual characteristics to the driver of the vehicle 60 is referred to as "driver B".

In step S20 shown in FIG. 8, the CPU 21 refers to driver A's individual characteristic information stored in the individual characteristic storage unit 32 to specify driver B having similar individual characteristics to driver A. Then, the process proceeds to step S21.

In step S21, the CPU 21 acquires the trained model of driver B specified in step S20 from the trained model storage unit 36. Then, the process proceeds to step S22.

In step S22, the CPU 21 updates the trained model of driver B that has been acquired in step S21 with the updated model for estimating the output method of the evaluation information that is suitable for driver A. Specifically, the CPU 21 inputs the driver A's individual characteristic information stored in the individual characteristic storage unit 32 and the driver A's reaction information stored in the individual reaction storage unit 34 to the trained model of driver B as learning data. As a result of machine learning, the trained model of driver B is updated with the updated model for estimating the output method of the evaluation information that is suitable for driver A. Then, the process proceeds to step S23.

In step S23, the CPU 21 associates the updated model updated in step S22 with driver A and stores it in the trained model storage unit 36. Then, the updating process ends.

Next, the flow of the changing process in which the management server 20 changes the output method of the evaluation information to be output from the monitor 78 and the speaker 79 of the vehicle 60 to the output method of the evaluation information that is suitable for the driver of the vehicle 60 will be described.

Figure 9:
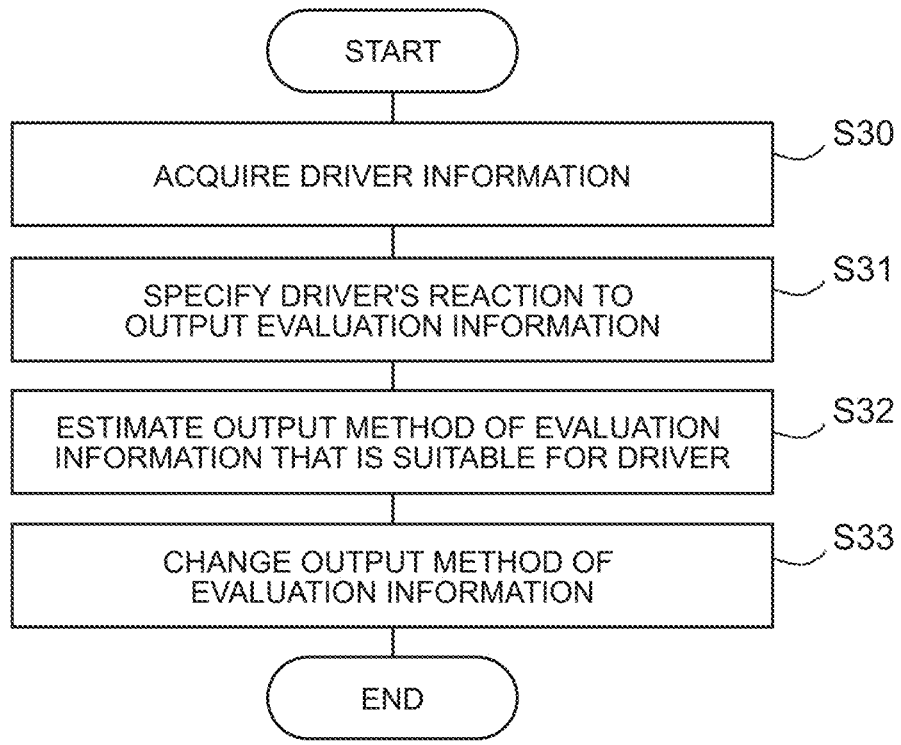
FIG. 9 is a flowchart showing a flow of a changing process executed by the management server according to the present embodiment.

FIG. 9 is a flowchart showing a flow of the changing process executed by the management server 20. The changing process is executed when the CPU 21 reads the information processing program 30B from the storage unit 24, expands the information processing program 30B into the RAM 23, and executes the program.

In step S30 shown in FIG. 9, the CPU 21 acquires the driver information from the vehicle 60. Then, the process proceeds to step S31. In the first embodiment, the driver information is transmitted from the vehicle 60 to the management server 20 periodically, for example, every day.

In step S31, the CPU 21 specifies whether the driver's reaction to the evaluation information that has been output from the monitor 78 and the speaker 79 while the vehicle 60 is being driven is good or bad. In the first embodiment, as an example, the CPU 21 specifies whether the driver's reaction to the evaluation information when the evaluation information is output from the monitor 78 and the speaker 79 while the vehicle 60 is being driven is good or bad, based on the behavior of the driver based on the driver information acquired in step S30. Then, the process proceeds to step S32.

In step S32, the CPU 21 estimates the output method of the evaluation information that is suitable for the driver based on whether the driver's reaction is good or bad that has been specified in step S31. Specifically, the CPU 21 inputs, to the updated model of the driver that is stored in the trained model storage unit 36, the driver's individual characteristic information stored in the individual characteristic storage unit 32 and the driver's reaction information stored in the individual reaction storage unit 34, to estimate the output method of the evaluation information that is suitable for the driver. Then, the process proceeds to step S33.

In step S33, the CPU 21 changes the output method of the evaluation information to be output from the monitor 78 and the speaker 79 to the output method of the evaluation information that has been estimated in step S32. In the first embodiment, the CPU 21 transmits the output method of the evaluation information that has been estimated in step S32 to the vehicle 60 to cause the vehicle 60 to change the output method of the evaluation information to be output from the monitor 78 and the speaker 79. Then, the changing process ends.

Next, the evaluation information output from the monitor 78 and the speaker 79 while the vehicle 60 is being driven before and after the changing process shown in FIG. 9 is executed will be described.

Figure 10A:
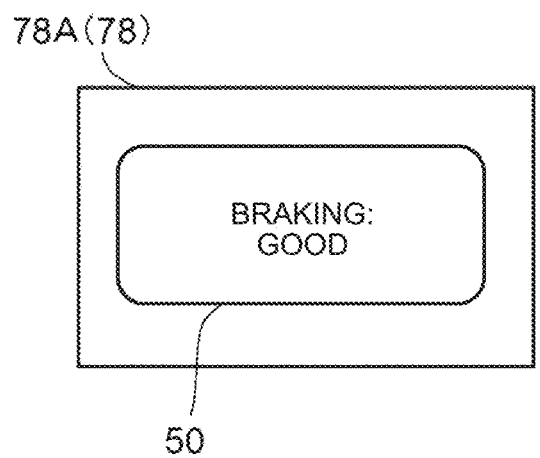
FIG. 10A is an explanatory diagram showing an output example of evaluation information output to a multi-information display (MID) during driving of the vehicle according to the present embodiment.
Figure 10B:
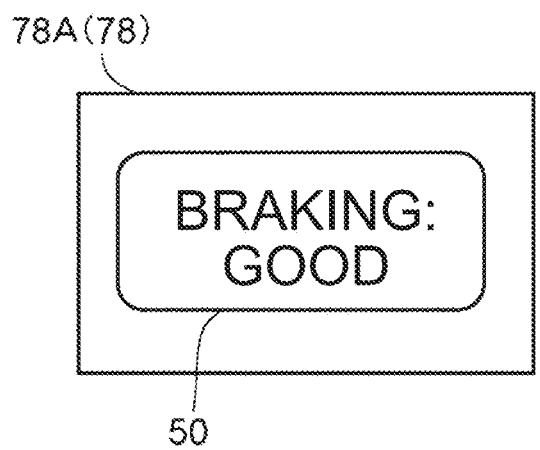
FIG. 10B is an explanatory diagram showing an output example of the evaluation information output to the MID during driving of the vehicle according to the present embodiment.

FIGS. 10A and 10B are explanatory diagrams showing output examples of the evaluation information output to the monitor 78, more specifically, to a multi-information display (hereinafter referred to as "MID") 78A while the vehicle 60 is being driven. Specifically, FIG. 10A is an output example of the evaluation information output to the MID 78A before execution of the changing process, and FIG. 10B is an output example of the evaluation information output to the MID 78A after the execution of the changing process.

As shown in FIGS. 10A and 10B, evaluation information 50 is output to the MID 78A. As an example, in FIGS. 10A and 10B, "Braking: Good" is output as the evaluation information 50 while the vehicle 60 is being driven. At this time, although the character contents of the evaluation information 50 in FIGS. 10A and 10B are the same, the character sizes of the evaluation information 50 are different. Specifically, the character size of the evaluation information 50 in the output example shown in FIG. 10B is larger than the character size of the evaluation information 50 in the output example shown in FIG. 10A. In this way, the output example shown in FIG. 10B is an example in which the output method of the evaluation information is changed because the CPU 21 has estimated that increasing the character size of the evaluation information 50 is more suitable for the driver, based on whether the driver's reaction when the evaluation information 50 shown in FIG. 10A was output to the MID 78A while the vehicle 60 was being driven was good or bad.

Figure 11A:
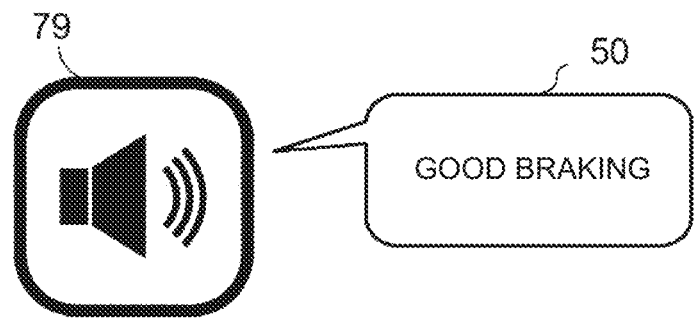
FIG. 11A is an explanatory diagram showing an output example of the evaluation information output from a speaker during driving of the vehicle according to the present embodiment.
Figure 11B:
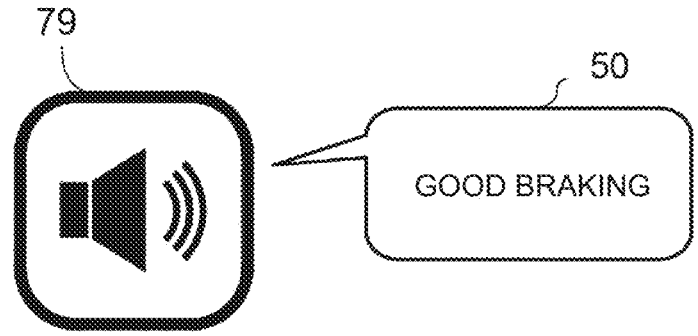
FIG. 11B is an explanatory diagram showing an output example of the evaluation information output from the speaker during driving of the vehicle according to the present embodiment.

FIGS. 11A and 11B are explanatory diagrams showing output examples of the evaluation information output from the speaker 79 while the vehicle 60 is being driven. Specifically, FIG. 11A is an output example of the evaluation information output from the speaker 79 before the execution of the changing process, and FIG. 11B is an output example of the evaluation information output from the speaker 79 after the execution of the changing process.

As shown in FIGS. 11A and 11B, the speaker 79 outputs the evaluation information 50. As an example, in FIG. 11A, while the vehicle 60 is being driven, the speaker 79 outputs a voice saying "Good braking" as the evaluation information 50. At this time, the voice output from the speaker 79 in FIG. 11A is a male voice with a harsh tone. Further, in FIG. 11B, while the vehicle 60 is being driven, the speaker 79 outputs a voice saying "Good braking" as the evaluation information 50. At this time, the voice output from the speaker 79 in FIG. 11B is a female voice with a gentle tone. In this way, the output example shown in FIG. 11B is an example in which the output method of the evaluation information is changed because the CPU 21 has estimated that outputting the evaluation information 50 via a female voice with a gentle tone is more suitable for the driver, based on whether the reaction of the driver when the evaluation information 50 shown in FIG. 11A was output from the speaker 79 while the vehicle 60 was being driven was good or bad.

As described above, in the management server 20, the CPU 21 specifies whether the driver's reaction to the evaluation information output from the monitor 78 and the speaker 79 while the vehicle 60 is being driven is good or bad. Further, the CPU 21 estimates the output method of the evaluation information that is suitable for the driver based on whether the specified driver's reaction is good or bad. The CPU 21 then changes the output method of the evaluation information to be output from the monitor 78 and the speaker 79 to the estimated output method of the evaluation information. As a result, the management server 20 changes the output method of the evaluation information based on whether the driver's reaction to the evaluation information output from the monitor 78 and the speaker 79 while the vehicle 60 is being driven is good or bad, enabling the output method of the evaluation information to be output to the inside of the vehicle to be suitable for the driver.

Further, in the management server 20, the CPU 21 updates the trained model that has undergone machine learning for adjusting the output method of the evaluation information that is suitable for another driver having individual characteristics similar to the driver, with the updated model for estimating the output method of the evaluation information that is suitable for the driver, using the driver's individual characteristic information and the driver's reaction information. As a result, in the management server 20, a model for estimating the output method of the evaluation information that is suitable for the driver can be generated in a shorter period of time using the trained model suitable for another driver having similar individual characteristics, compared to the case where the above trained model is not used.

Further, in the management server 20, the CPU 21 estimates the output method of the evaluation information that is suitable for the driver based on whether the specified driver's reaction is good or bad. As a result, the management server 20 can output the evaluation information from the monitor 78 and the speaker 79 by an output method optimized based on the driver's individual characteristics and whether the driver's reaction to the evaluation information output from the monitor 78 and the speaker 79 while the vehicle 60 is being driven is good or bad.

Furthermore, in the management server 20, the CPU 21 specifies whether the driver's reaction to the evaluation information output from the monitor 78 and the speaker 79 is good or bad based on the behavior of the driver when the evaluation information is output from the monitor 78 and the speaker 79. As a result, the management server 20 can make the output method of the evaluation information to be output to the inside of the vehicle while the vehicle is being driven suitable for the driver without asking the driver for his/her opinion on the output method of the evaluation information output from the monitor 78 and the speaker 79.

Second Embodiment

Next, a second embodiment of the information processing system 10 according to the present embodiment will be described while omitting or simplifying the overlapping portion with the other embodiments.

In the second embodiment, the specification unit 21C specifies whether the driver's reaction to the evaluation information output from the monitor 78 and the speaker 79 is good or bad based on an answer of the driver of the vehicle 60 to a question regarding the evaluation information.

First, based on the fact that the acquisition unit 21A acquires information that the ignition switch (not shown) of the vehicle 60 has been switched from the ON position to the OFF position as the driving operation information, the specification unit 21C transmits content information including the question regarding the evaluation information to the driver terminal 40. Then, based on the fact that the acquisition unit 21A acquires answer information indicating the driver's answer to the question as the driving operation information, the specification unit 21C uses the content of the answer information to specify whether the driver's reaction to the evaluation information output from the monitor 78 and the speaker 79 is good or bad.

Figure 12:
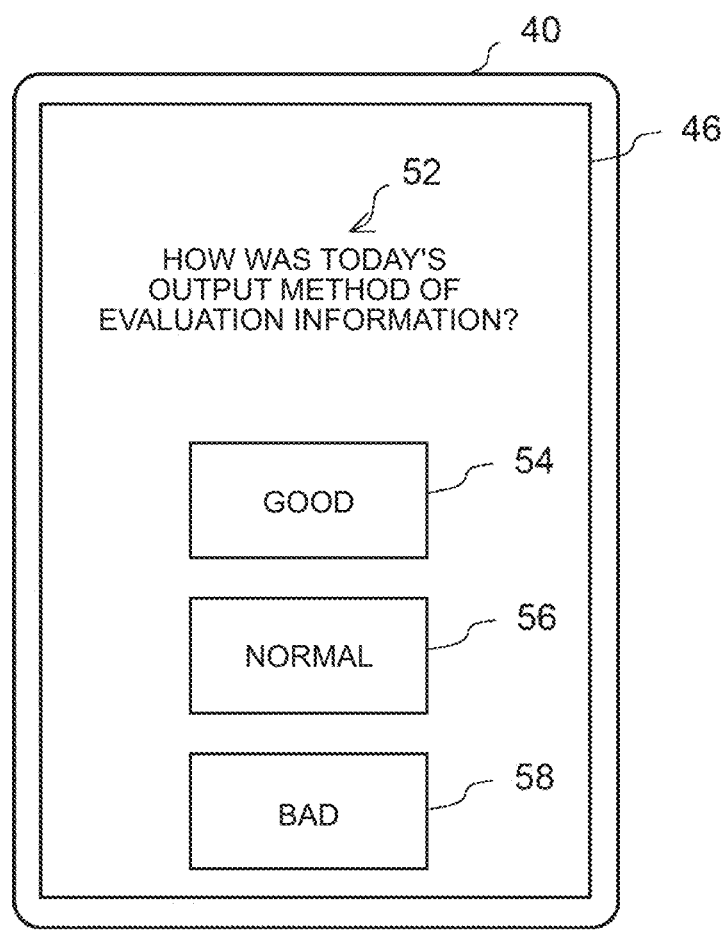
FIG. 12 is a display example displayed on a display unit of the driver terminal according to the present embodiment.

FIG. 12 is a display example displayed on the display unit 46 of the driver terminal 40.

In the display example shown in FIG. 12, message information 52, a good button 54, a normal button 56, and a bad button 58 are displayed.

The message information 52 indicates various messages to the driver. As an example, in FIG. 12, the message information 52 is displayed as "How was today's output method of evaluation information?" In this way, the message information 52 shown in FIG. 12 presents whether the output method of the evaluation information output from the monitor 78 and the speaker 79 was good or bad to the driver as the question regarding the evaluation information.

The good button 54 is a button operated when the driver felt that the output method of the evaluation information was good.

The normal button 56 is a button operated when the driver felt that the output method of the evaluation information was neither good nor bad.

The bad button 58 is a button operated when the driver felt that the output method of the evaluation information was bad.

When any one of the good button 54, the normal button 56, and the bad button 58 is operated, the driver terminal 40 transmits the answer information indicating which button was operated to the management server 20. The management server 20 that has acquired the answer information specifies, as a function of the specification unit 21C, whether the driver's reaction to the evaluation information output from the monitor 78 and the speaker 79 is good or bad from the content of the answer information. Specifically, when the content of the answer information indicates the operation of the good button 54, the specification unit 21C specifies that the driver's reaction to the evaluation information output from the monitor 78 and the speaker 79 while the vehicle 60 is being driven is "good". When the content of the answer information indicates the operation of the normal button 56, the specification unit 21C specifies that the driver's reaction to the evaluation information is "normal". When the content of the answer information indicates the operation of the bad button 58, the specification unit 21C specifies that the driver's reaction to the evaluation information is "bad".

As described above, in the management server 20, the CPU 21 specifies whether the driver's reaction to the evaluation information output from the monitor 78 and the speaker 79 is good or bad based on the answer of the driver of the vehicle 60 to the question regarding the evaluation information. As a result, the management server 20 can more accurately specify the driver's reaction compared to the case where the driver's reaction to the evaluation information output from the monitor 78 and the speaker 79 is specified only by an indirect method.

Others

In the above-described embodiments, the management server 20 is used an example of the information processing device. However, the present disclosure is not limited to this, and the on-board device 15 mounted on the vehicle 60 may be used as an example of the information processing device, and a combination of the management server 20 and the on-board device 15 may be used as an example of the information processing device. When a combination of the management server 20 and the on-board device 15 is used as an example of the information processing device, the updating process shown in FIG. 8 and the changing process shown in FIG. 9 are executed by one processor of the CPU 21 of the management server 20 or the CPU 61 of the on-board device 15, or by a combination of multiple processors of the CPU 21 of the management server 20 and the CPU 61 of the on-board device 15.

In the above-described embodiments, both the monitor 78 and the speaker 79 of the vehicle 60 are used as an example of the output unit. However, the present disclosure is not limited to this, and one of the monitor 78 and the speaker 79 may be used as an example of the output unit. Further, at least one of the display unit 46 and a speaker (not shown) of the driver terminal 40 may be used as an example of the output unit, without being limited to the monitor 78 and the speaker 79 of the vehicle 60.

In the above-described embodiments, as the driver information, the operation of the cancel switch and the image of the driver's face within a predetermined time after the evaluation information is output are transmitted from the vehicle 60 to the management server 20. At this time, in place of or in addition to the above information, a voice uttered by the driver that is collected by the microphone 75 of the vehicle 60 within a predetermined time after the evaluation information is output may be transmitted from the vehicle 60 to the management server 20 as the driver information. In this case, the management server 20 that has acquired the voice uttered by the driver can detect, as a function of the specification unit 21C, the driver's emotion as the driver's behavior when the evaluation information is output from the monitor 78 and the speaker 79. As an example, when the specification unit 21C detects the driver's negative emotion as the behavior based on the voice uttered by the driver that is acquired as the driver information, the specification unit 21C can specify that the driver's reaction to the evaluation information is "bad". Further, when the specification unit 21C detects the driver's positive emotion as the behavior based on the voice uttered by the driver that is acquired as the driver information, the specification unit 21C can specify that the driver's reaction to the evaluation information is "good". The specification unit 21C detects the driver's emotion by performing a known voice analysis process on the voice uttered by the driver that is acquired by the acquisition unit 21A as the driver information.

In the above-described embodiments, the trained model suitable for another driver having individual characteristics similar to the driver of the vehicle 60 is updated with the updated model for estimating the output method of the evaluation information that is suitable for the driver, using the driver's individual characteristic information and the driver's reaction information. However, the present disclosure is not limited to this, and a model for estimating the output method of the evaluation information that is suitable for the driver of vehicle 60 may be generated without using the trained model suitable for another driver. For example, when the CPU 21 determines that there is no other driver having individual characteristics similar to the driver, a model for estimating the output method of the evaluation information that is suitable for the driver may be generated without using the trained model suitable for another driver. Even when the CPU 21 determines that there is another driver having individual characteristics similar to the driver, when the trained model is not desired to be used, a model for estimating the output method of the evaluation information that is suitable for the driver may be generated without using the trained model.

It should be noted that various processors other than the CPU may execute the learning process, the updating process, and the changing process that are executed when the CPU 21 reads the software (program) in the above embodiments. Examples of the processors in this case include a programmable logic device (PLD) such as a field-programmable gate array (FPGA) for which a circuit configuration can be changed after production, a dedicated electric circuit that is a processor having a circuit configuration designed exclusively for executing a specific process, such as an application specific integrated circuit (ASIC), and the like. Further, the learning process, the updating process, and the changing process may be executed by one of these various processors, or by a combination of two or more processors of the same type or different types (for example, a combination of FPGAs, a combination of a CPU and an FPGA, and the like). The hardware structure of each of the various processors is, more specifically, an electric circuit in which circuit elements such as semiconductor elements are combined.

Further, in the above-described embodiments, the mode in which the learning program 30A and the information processing program 30B are stored (installed) in the storage unit 24 in advance has been described, but the present disclosure is not limited to this. The learning program 30A and the information processing program 30B may be stored in a storage medium such as a compact disc read-only memory (CD-ROM), a digital versatile disc read-only memory (DVD-ROM), and a universal serial bus (USB) memory to be provided. The learning program 30A and the information processing program 30B may be downloaded from an external device via the network N.

What is claimed is:

1. An information processing device, comprising:
   one or more processors configured to
   specify by identifying a reaction of a driver of a vehicle to evaluation information that evaluates driving of the driver and that is output from an output unit while the vehicle is being driven;
   estimate an output method of the evaluation information that is appropriate for the driver based on the specified reaction of the driver;
   change the output method of the evaluation information to be output from the output unit to the estimated output method of the evaluation information; and
   update a trained model that has undergone machine learning for adjusting another output method that is appropriate for another driver having an individual characteristic similar to the driver with a model for estimating the output method of the evaluation information that is appropriate for the driver, using individual characteristic information indicating an individual characteristic of the driver and reaction information in which the specified reaction of the driver is accumulated, wherein
   the one or more processors are configured to determine the another driver having the individual characteristic similar to the driver based on a matching degree between the individual characteristic information of the driver and the individual characteristic information of the another driver being equal to or higher than a predetermined standard.

2. The information processing device according to claim 1, wherein
the one or more processors are configured to input the individual characteristic information of the driver and the reaction information of the driver to the updated model to estimate the output method of the evaluation information that is appropriate for the driver.

3. The information processing device according to claim 1, wherein
the one or more processors are configured to specify the reaction of the driver to the evaluation information output from the output unit, based on behavior of the driver when the evaluation information is output from the output unit.

4. The information processing device according to claim 3, wherein
the one or more processors are configured to specify the reaction of the driver to the evaluation information output from the output unit, based on an answer of the driver to a question regarding the evaluation information.

5. The information processing device according to claim 4, wherein
the one or more processors are configured to, in a state in which an ignition switch of the vehicle is turned OFF, transmit the question to a terminal device of the driver, and
acquire the answer input by the driver.

6. The information processing device according to claim 5, wherein
the one or more processors are configured to further specify the reaction of the driver to the evaluation information based on at least one of a captured image of the driver, a voice emitted by the driver, or the answer input by the driver.

7. An information processing method in which a computer executes processes comprising:
specifying by identifying a reaction of a driver of a vehicle to evaluation information that evaluates driving of the driver and that is output from an output unit while the vehicle is being driven;
estimating an output method of the evaluation information that is appropriate for the driver based on the specified reaction of the driver;
changing the output method of the evaluation information to be output from the output unit to the estimated output method of the evaluation information; and
updating a trained model that has undergone machine learning for adjusting another output method that is appropriate for another driver having an individual characteristic similar to the driver with a model for estimating the output method of the evaluation information that is appropriate for the driver, using individual characteristic information indicating an individual characteristic of the driver and reaction information in which the specified reaction of the driver is accumulated, wherein
the processes further comprise determining the another driver having the individual characteristic similar to the driver based on a matching degree between the individual characteristic information of the driver and the individual characteristic information of the another driver being equal to or higher than a predetermined standard.

8. The information processing method according to claim 7, wherein
the reaction of the driver to the evaluation information output from the output unit is specified based on an answer of the driver to a question regarding the evaluation information.

9. The information processing method according to claim 8, wherein
the processes further comprise, in a state in which an ignition switch of the vehicle is turned OFF,
transmitting the question to a terminal device of the driver, and
acquiring the answer input by the driver.

10. The information processing method according to claim 9, wherein
the reaction of the driver to the evaluation information is further specified based on at least one of a captured image of the driver, a voice emitted by the driver, or the answer input by the driver.

11. A non-transitory storage medium storing an information processing program that causes a computer to execute processes comprising:
specifying by identifying a reaction of a driver of a vehicle to evaluation information that evaluates driving of the driver and that is output from an output unit while the vehicle is being driven;
estimating an output method of the evaluation information that is appropriate for the driver based on the specified reaction of the driver; 0 changing the output method of the evaluation information to be output from the output unit to the estimated output method of the evaluation information; and
updating a trained model that has undergone machine learning for adjusting another output method that is appropriate for another driver having an individual characteristic similar to the driver with a model for estimating the output method of the evaluation information that is appropriate for the driver, using individual characteristic information indicating an individual characteristic of the driver and reaction information in which the specified reaction of the driver is accumulated, wherein
the processes further comprise determining the another driver having the individual characteristic similar to the driver based on a matching degree between the individual characteristic information of the driver and the individual characteristic information of the another driver being equal to or higher than a predetermined standard.

12. The non-transitory storage medium according to claim 11, wherein
the reaction of the driver to the evaluation information output from the output unit is specified based on an answer of the driver to a question regarding the evaluation information.

13. The non-transitory storage medium according to claim 12, wherein
the processes further comprise, in a state in which an ignition switch of the vehicle is turned OFF,
transmitting the question to a terminal device of the driver, and
acquiring the answer input by the driver.

14. The non-transitory storage medium according to claim 13, wherein
the reaction of the driver to the evaluation information is further specified based on at least one of a captured image of the driver, a voice emitted by the driver, or the answer input by the driver.

* * * * *